US007234421B2

(12) United States Patent
Natividade et al.

(10) Patent No.: US 7,234,421 B2
(45) Date of Patent: Jun. 26, 2007

(54) ANIMAL DATA GATHERING METHOD AND DEVICE

(75) Inventors: Albert Lobo Natividade, Berkshire (GB); Brian George Merrell, Northumberland (GB); Sarah Margaret Gardner, Berkshire (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/472,646

(22) PCT Filed: Mar. 20, 2002

(86) PCT No.: PCT/IB02/00813

§ 371 (c)(1),
(2), (4) Date: Feb. 17, 2004

(87) PCT Pub. No.: WO02/076193

PCT Pub. Date: Oct. 3, 2002

(65) Prior Publication Data

US 2004/0150528 A1 Aug. 5, 2004

(30) Foreign Application Priority Data

Mar. 22, 2001 (GB) .................................. 0107210.7
Jun. 1, 2001 (GB) .................................. 0113325.5

(51) Int. Cl.
*A01K 29/00* (2006.01)
(52) U.S. Cl. ..................... 119/720; 119/174; 340/573.3
(58) Field of Classification Search ................ 119/174, 119/719, 720, 721, 840; 340/573.1, 573.2, 340/573.3
See application file for complete search history.

(56) References Cited

U.S. PATENT DOCUMENTS

| 3,872,995 | A | | 3/1975 | Eickhorst ..................... 220/4 R |
| 4,247,758 | A | | 1/1981 | Rodrian ................. 235/92 MS |
| 4,262,632 | A | * | 4/1981 | Hanton et al. ........... 119/51.02 |
| 4,411,274 | A | * | 10/1983 | Wright ........................ 600/551 |
| 4,475,481 | A | * | 10/1984 | Carroll ..................... 119/51.02 |
| 4,844,076 | A | * | 7/1989 | Lesho et al. ................ 600/302 |
| 4,865,044 | A | * | 9/1989 | Wallace et al. ............. 600/549 |
| 5,150,282 | A | | 9/1992 | Tomura et al. ............. 361/424 |

(Continued)

FOREIGN PATENT DOCUMENTS

CH 682364G A3 9/1993

(Continued)

OTHER PUBLICATIONS

Gold-Handys.com, XP002170174, "Nokia 8850", retrieved from the Internet on Jun. 20, 2001.

(Continued)

*Primary Examiner*—Yvonne R. Abbott
(74) *Attorney, Agent, or Firm*—Harrington & Smith, PC

(57) ABSTRACT

An animal data gathering device comprise: a radio transmitter and receiver, a processor for controlling the operation of the device, and memory for storing, information including a first unique identifier associated with the device, wherein the processor is arranged to transmit a signal, by means of the radio transmitter, and to receive, by means of the radio receiver, one or more signals, each representing a second unique identifier from other devices and the processor is arranged to store in the memory each second unique identifier. Thus a record is kept of all radio devices with which the device has come into radio contact.

27 Claims, 6 Drawing Sheets

U.S. PATENT DOCUMENTS

| | | | |
|---|---|---|---|
| 5,322,034 A | 6/1994 | Willham et al. | 119/174 |
| 5,357,439 A | 10/1994 | Matsuzaki et al. | 364/468 |
| 5,410,141 A | 4/1995 | Koenck et al. | 235/472 |
| 5,481,262 A * | 1/1996 | Urbas et al. | 340/870.17 |
| 5,499,626 A * | 3/1996 | Willham et al. | 600/300 |
| 5,542,431 A * | 8/1996 | Starzl et al. | 600/551 |
| 5,661,634 A | 8/1997 | Obata et al. | 361/684 |
| 5,697,384 A * | 12/1997 | Miyawaki et al. | 128/899 |
| 5,768,370 A | 6/1998 | Maatta et al. | 379/433.01 |
| 5,931,764 A | 8/1999 | Freeman et al. | 482/4 |
| 5,960,078 A | 9/1999 | Eckhardt | 379/433.11 |
| 5,988,106 A * | 11/1999 | van den Berg | 119/51.02 |
| 6,128,515 A | 10/2000 | Kabler et al. | 455/566 |
| 6,155,208 A | 12/2000 | Schell et al. | 119/720 |
| 6,271,757 B1 * | 8/2001 | Touchton et al. | 340/573.1 |
| 6,441,778 B1 * | 8/2002 | Durst et al. | 342/357.07 |
| 2006/0027185 A1 * | 2/2006 | Troxler | 119/721 |
| 2006/0150920 A1 * | 7/2006 | Patton | 119/712 |

FOREIGN PATENT DOCUMENTS

| | | |
|---|---|---|
| CH | 688982 A5 | 6/1998 |
| DE | 2346759 A1 | 2/1975 |
| DE | 8304706.9 U1 | 7/1983 |
| DE | 3742557 A1 | 6/1989 |
| DE | 4401683 A1 | 7/1995 |
| DE | 29904922 U1 | 5/2000 |
| DE | 20014882 U1 | 2/2001 |
| EP | 0011810 A1 | 6/1980 |
| EP | 0466248 A1 | 1/1992 |
| EP | 0610689 A1 | 8/1994 |
| EP | 0781080 A1 | 6/1997 |
| EP | 0790584 A2 | 8/1997 |
| EP | 0932288 A1 | 7/1999 |
| EP | 0945060 A2 | 9/1999 |
| EP | 1020807 A1 | 7/2000 |
| EP | 1026868 A1 | 8/2000 |
| FR | 1408204 | 4/1964 |
| FR | 2737837 A3 | 2/1997 |
| FR | 2784485 A1 | 4/2000 |
| GB | 064879 A | 6/1981 |
| GB | 2293517 A | 3/1996 |
| GB | 2318476 A | 4/1998 |
| GB | 2322501 A | 8/1998 |
| GB | 2331888 A | 6/1999 |
| GB | 2339993 A | 2/2000 |
| GB | 2343972 A | 5/2000 |
| WO | WO-92/01250 A1 | 1/1992 |
| WO | WO-98/47351 A1 | 10/1998 |
| WO | WO-00/77666 A2 | 12/2000 |
| WO | WO-01/24072 A1 | 4/2001 |
| WO | WO-02/49323 A1 | 6/2002 |

OTHER PUBLICATIONS

Gold-Handys.com, XP002170175, "Motorola v3688", retrieved from the Internet on Jun. 20, 2001.

Gold-Handys.com, XP002170176, "Ericcson t28s", retrieved from the Internet on Jun. 20, 2001.

Patent Abstracts of Japan, JP11-276008, Norinsuisansho Tohokunogyo Shikenjyo Cho.

Patent Abstracts of Japan, JP11248816A, Komatsu Gen Service KK.

Motorola V Series for 51 400 EUR.

Patent Abstracts of Japan, JP2001215885A, Kato Shigeru.

Patent Abstracts of Japan, JP11196162A, M. Shimada and U. Ryuichi.

Patent Abstracts of Japan, JP8274851A, Sanyo Electric Co. Ltd.

Patent Abstracts of Japan, 2002295329A, Hitachi Ltd., Hitachi Car Eng. Co., Ltd.

Patent Abstracts of Japan, 2000036704A, Kanagata Mukawa:KK.

Patent Abstracts of Japan, 2000305987A, YKK Architectural Products, Inc.

Patent Abstracts of Japan, 10304034A, Kawai Musical Instr. Mfg. Co. Ltd.

* cited by examiner

ANIMAL DATA GATHERING METHOD AND DEVICE

FIELD OF THE INVENTION

This invention relates to an electronic species data gathering method and system, in particular an electronic animal data gathering method and system for use in tracking the movement of all species of the animal kingdom, such as agricultural livestock (cattle, sheep, pigs etc) or wild animals such as game, birds, mammals, fish etc., and tracking the contact between these animal species.

BACKGROUND OF THE INVENTION

In the wild, animals such as badgers are blamed for outbreaks of tuberculosis in cows but this is a difficult issue to prove since it is difficult to establish that contact between the different species has occurred.

In modern livestock farming, animals are moved a large number of times during their lifetimes. For breeding stock, the animals are normally reared on a specialist livestock farm before being transferred to other livestock farms to see out their productive lives. This transfer is usually not direct but is likely to involve an auction market, at least one livestock dealer (but frequently more) and two haulage contractors. Breeding animals at the end of their productive lives are then sent for slaughter. This again is rarely a direct transaction with animals usually passing through a cull stock market before finally reaching an abattoir or renderer.

The pathway for prime meat animals is usually more convoluted than that of breeding stock. Animals may be reared and finished (obtain a weight and fat cover appropriate for slaughter) on their farm of origin. This is the simplest system and involves the least number of animal movement transactions. Typically, either finished animals will be sold directly to the abattoir or they will be sold through a fat stock market, before being transferred to the abattoir. Finally, the abattoirs transfer the meat to wholesalers and retailers. Whereas the majority of pigs are reared and finished on their farm of origin, a relatively high proportion of calves and lambs are sold as store animals. Store animals require a period, of variable length, on high nutrition before they reach a condition ready for slaughter.

The store to finish pathway involves a large number of animal movements with animals being transferred initially from their rearing farms to store markets. Thereafter, they are purchased by dealers who group animals according to breed, weight, size etc before selling on usually to another dealer. These animals are eventually sold to a finisher who will take the animals through to slaughter weight. The pathway from this point is the same as for animals finished on their farm of origin. They are either sold directly to abattoirs or initially to fat stock markets and then to the abattoir.

All these movement transactions generate a mass of associated paperwork, especially, in the United Kingdom, in the case of cattle where a national mainly paper-based passport system operates. This large number of animal movements makes tracking animals very difficult. As consumers increasingly demand assurances concerning animal welfare and validation of preferred production systems, such as organic, the need to track accurately animals as they move down the production chain is increasing. In addition, the moving and mixing of animals at each step in these pathways is of considerable importance in the spread of infectious diseases. The large numbers of infected animals and the rapid spread of foot and mouth disease have vividly demonstrated this.

Various means are known for keeping track of animal movements. The first, and least sophisticated, is a plastic ear tag on which is printed a unique identifier such as a number and/or letter sequence. Such a system requires manual records to be kept, which can result in inaccuracies and omissions. Also known are electronic transponders such as those made by Allflex New Zealand Limited. These devices contain an electronic transponder which can be read by an electronic reader. An example of such a device is described in International Patent Application No. WO93/22907.

A more sophisticated electronic system is described in International Patent Application No. WO99/45761. In this system an electronic device incorporates an electronic radio frequency identification device that can be read by a reader. The electronic device stores information relating to a specific animal such as a unique identifier, inoculation information, feeding information, health etc. The electronic device may be carried on a collar or ear tag, implanted in the animal or provided as a bolus, to be swallowed by the animal and maintained in the stomach.

SUMMARY OF THE INVENTION

In accordance with a first aspect of the invention there is provided an animal data gathering device comprising a radio transmitter and receiver, a processor for controlling the operation of the device, and memory for storing information including a first unique identifier associated with the device, wherein the processor is arranged to transmit an inquiry signal, by means of the radio transmitter, and to receive, by means of the radio receiver, one or more signals, each representing a unique identifier from other devices, and the processor is arranged to store in the memory each received unique identifier.

Thus the invention provides an efficient, automatic record of all devices with which a first device has been in radio contact, thus simplifying the procedure of tracking all the animals or sites with which the animal in question has been in contact. A device according to the invention may be provided for an animal, transport vehicle, livestock market, farm building etc.

Thus each animal is fitted with a tagging device that holds the animal's unique identifier and a record of the unique identifiers with which the animal has come into radio contact. Preferably date information is also stored with the unique identifier, said date information representing when the contact was made. A reader can then be used to access this information, the reader being hand-held or fixed. The reader collates the information relating to the unique identifiers stored in the device. The device may also store personal history for the animal associated with the device e.g. feeding practice, inoculations, illnesses, offspring produced etc.

The device may be arranged to transmit, in the inquiry signal, data representing the first unique identifier. This means that all devices that receive the inquiry signal also receive the unique identifier of the transmitting device and can store this in the memory of the receiving device.

The device may be arranged to enable the storing of a received unique identifier only in response to an inquiry signal being transmitted by the said device. Alternatively the device may be arranged to store the unique identifiers included in any signals received by the device. In this way, a device that has not transmitted an inquiry signal, but which is in radio contact with devices responding to the inquiry signal, is arranged to store the unique identifiers of all those devices with which it is in radio contact, even though the device itself did not send out the inquiry signal.

Preferably the processor is arranged to store in the memory short term parameters and long term parameters wherein the short term parameters comprise unique identifiers which have been received within a first predetermined period and the long term parameters comprise unique identifiers which have been received with a second predetermined period, said first predetermined period being shorter than said second pre-determined period.

In a preferred embodiment, before the processor converts a short term parameter into a long term parameter, the processor is arranged to check whether the unique identifier represented by the short term parameter has already been represented by a long term parameter and, if so, to delete the short term parameter and, if not, to convert the short term parameter into a long term parameter.

Preferably the processor is programmed with a maximum number of short term parameters and long term parameters for each received unique identifier. Thus the device may maintain a compressed record of the contacts made with a particular other device. Preferably, when the maximum number of parameters is greater than or equal to two, the device is arranged to store the oldest and the most recent of the short term/long term parameters, as appropriate.

The processor may be arranged to enable the management of the short term and long term parameters at pre-determined time intervals and/or in response to the memory reaching a pre-determined level of capacity.

The device may also including location circuitry, such as Global Positioning System (GPS) circuitry, for providing information relating to the geographical location of the device.

The device may be incorporated into an ear tag, a collar, an implant or a bolus for attachment to an animal in some way.

The unique identifier may include information relating to the type of device or type of animal associated with the device (cow, sheep, pig, deer, badger etc). Such a system provides a register of the contacts made by an animal with each individual of the same flock and/or species and with individuals of other flocks or species. The device may be arranged to only respond to inquiries from other devices having the same device or animal type specified.

In accordance with a second aspect of the invention there is provided an electronic animal data gathering method comprising transmitting from a first device a radio signal, receiving at the device one or more signals each representing a unique identifier from other devices and storing in memory each received unique identifier.

The unique identifier may include information relating to the type of device or animal associated with the device (cow, sheep, pig etc) and the device may be arranged to only respond to inquiries from other devices having the same specified type.

BRIEF DESCRIPTION OF THE DRAWINGS

Other features of the device as described herein are also applicable to a method according to the invention and should be read in this manner.

The invention will now be described by way of example only with reference to the accompanying drawings in which.

DETAILED DESCRIPTION OF THE INVENTION

In the livestock environment, it is intended that devices according to the invention are associated with agricultural livestock and also with premises and transport vehicles involved in the business of agriculture e.g. livestock markets, abattoirs, transport vehicles, farm buildings etc.

Although the invention is being described in greater detail with reference to the livestock environment, the invention is equally applicable to other environments. By way of example only, devices of the invention may also be associated with other domestic or wild animal species or with features used by these species in feeding, reproduction, courtship, migration or dispersal such as feeding troughs, trees, fences, marking posts, fish ladders, and similar.

Figure 1:
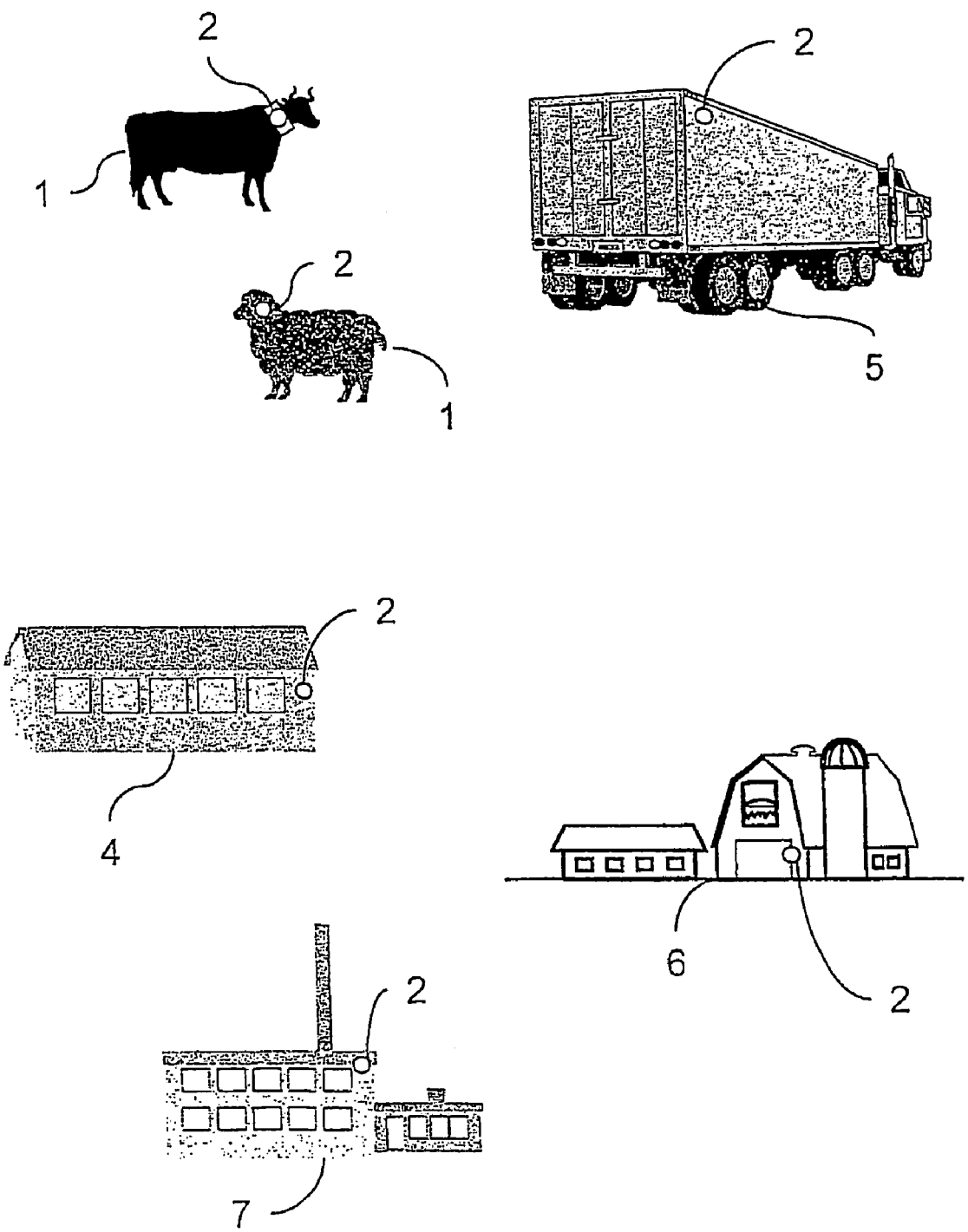
FIG. 1 illustrates an example of an animal movement system in accordance with the invention.

FIG. 1 shows an example of such a system. Each agricultural animal 1 has a device 2 according to the invention associated with it in some way. To prevent fraud or error, it is important that the device is tamper-proof and also extremely difficult to remove from the animal. The device may be formed as an ear tag, collar, implant or bolus. As mentioned above, it is intended that devices according to the invention are also provided at agricultural premises or on transport vehicles. For instance, a device 2 may be provided at each entrance to a livestock market 4. This device forms a record of all devices that have come into radio contact with it and hence all animals or locations with which those devices are associated. Similarly, a device 2 may be provided on an agricultural transport vehicle 5 (e.g. near the ramp of a truck) or farm building 6 to record all devices that have come into radio contact with the device on the truck 5 or farm 6. An abattoir 7 may also be provided with one or more devices 2 to maintain a record of all devices that have come into radio contact with the devices at the abattoir 7.

Figure 2:
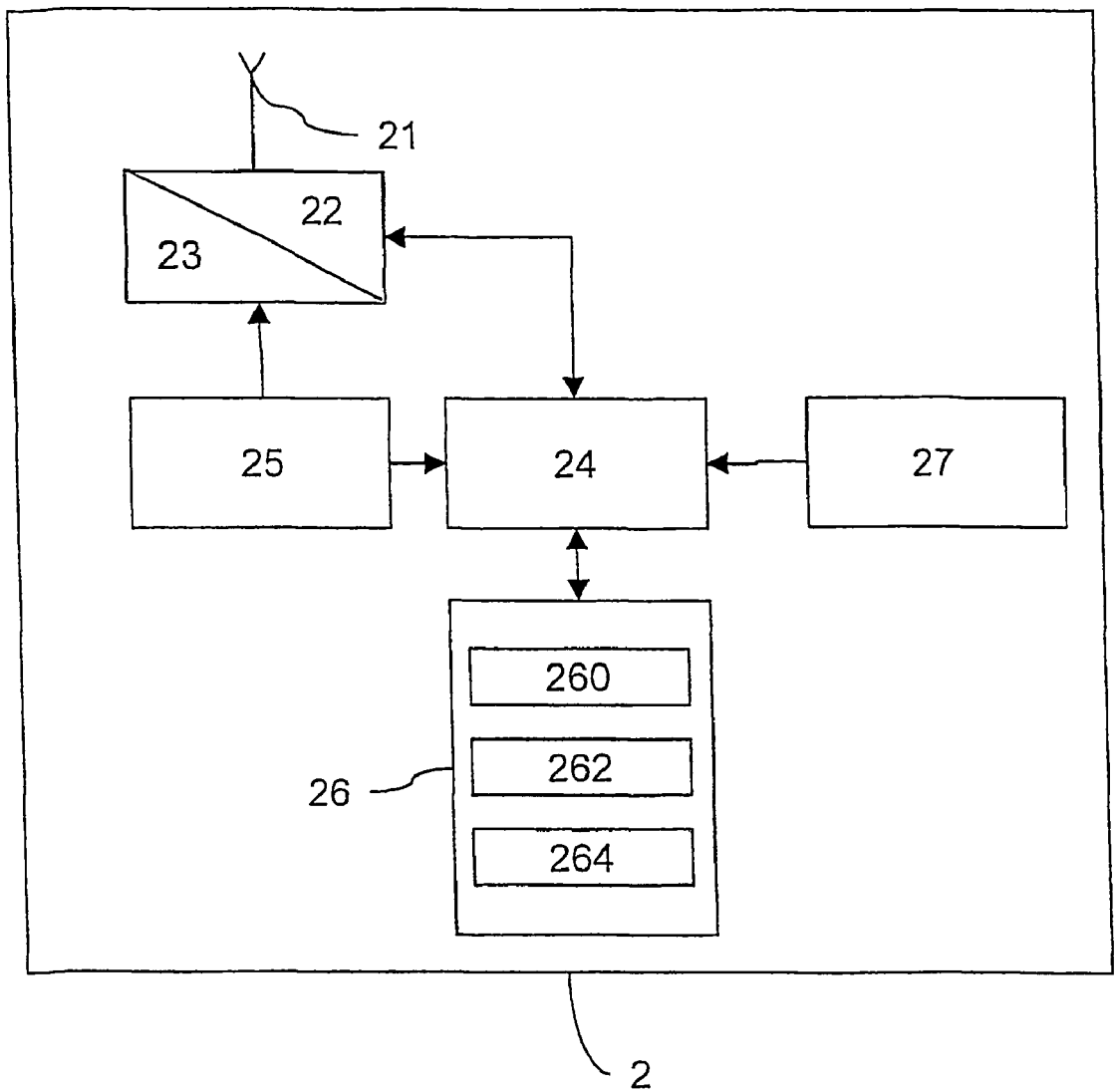
FIG. 2 is a block diagram of a device according to the invention.

As shown in FIG. 2, the device 2 according to the invention comprises an antenna 21, a radio transmitter 22, a radio receiver 23, a processor 24, a power source 25, a data storage module 26 and a system clock 27. The device may include other components but only those components material to the invention are shown.

The radio transmitter/receiver 22, 23 operates as a low power, radio frequency wireless system. In the preferred embodiment, the radio transmitter/receiver 22, 23 operates according to an ad-hoc wireless networking protocol such as that set out in the Bluetooth™ specification or the Wireless Personal Access Network consensus standard as set out in IEEE recommendation 802.15.1 or 802.15.4 (multi-month to multi-year system).

For devices designed to be associated with an animal, a suitable transmission range for the transmitter is envisaged to be up to 10 meters. Devices to be associated with a location (e.g. a farm, transport vehicle, livestock market or abattoir) may be provided with a transmitter having a greater range e.g. 50 m. A device for use in a reader may have a variable transmission range which may be selected according to the proposed task of the reader.

The processor 24 may be any suitable processor but preferably is a low power processor to minimise the power consumption of the device.

The power source 25 may be any suitable source. For example, if the device is accessible to the open air, the power source may be an array of solar cells. Otherwise the power source is likely to be a long-life battery or a kinetic energy conversion device.

The data storage module 26 comprises non-volatile memory and stores a first unique identifier 260 electronically coded into the data storage module. This unique identifier is permanently associated with the device and hence the animal or article the device is attached to in some way. To prevent fraud or error, this part of the memory 26 is write-protected and may only be changed by authorised persons e.g. the manufacturer or a government body. The data storage module stores further unique identifiers as short term parameters 262 and as long term parameters 264 as will be discussed below.

For a device 2 intended to be associated with an animal, it is envisaged that the memory has capacity for storing up to 3000 records for the short term parameters list and 13000 records for the long term parameters list. Each record representing a unique identifier may be 32 bytes each. Thus, without compression, the capacity of data storage module 26 is around 500 kbytes. For a device intended for purposes other than attaching to an animal, the memory may be larger as size is not so constrained.

Figure 3:
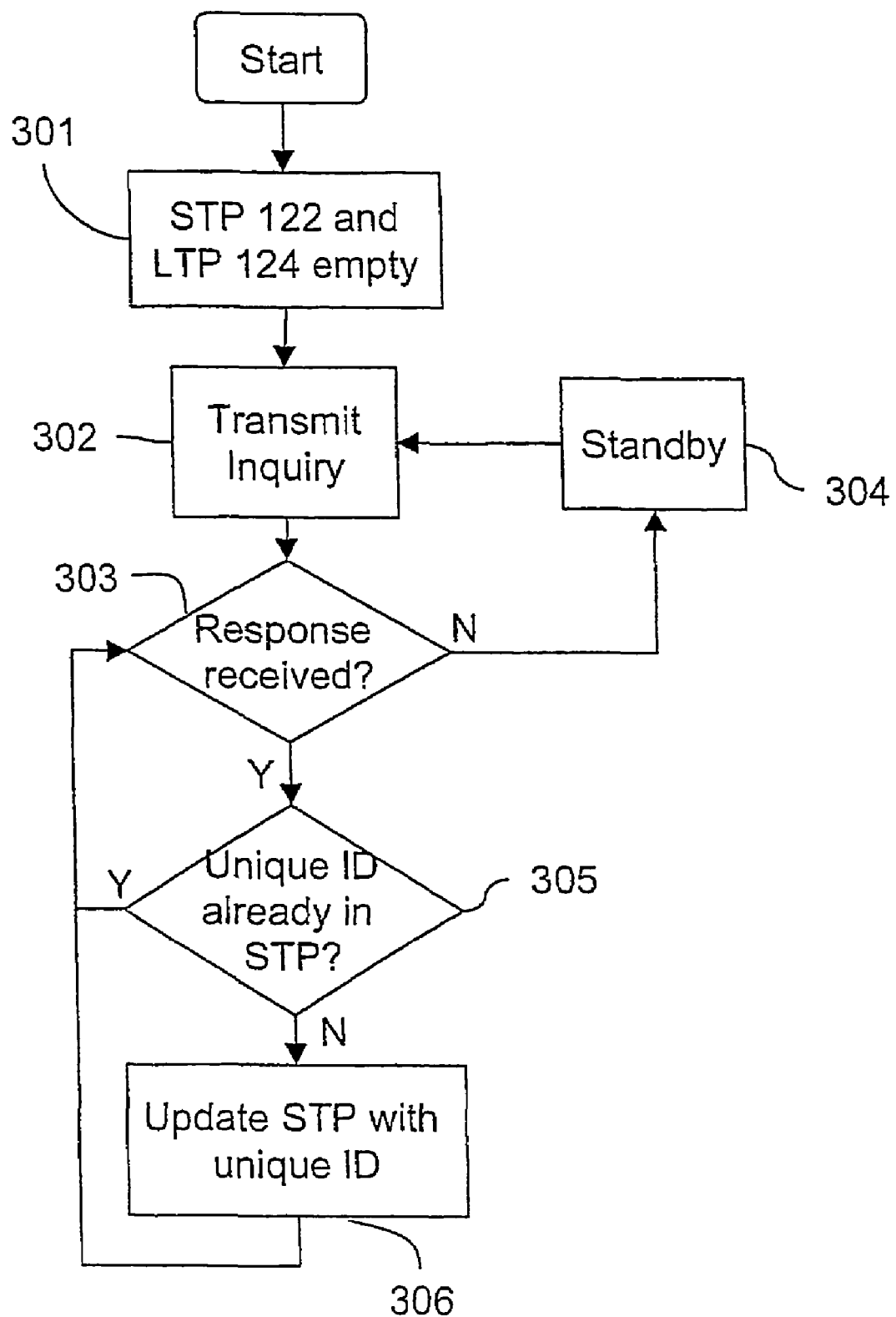
FIG. 3 is a flow diagram illustrating the inquiry operation of a device according to the invention.

The invention establishes a wireless network system in a similar manner to so-called Personal Access Networks. FIG. 3 illustrates the operation of an embodiment of a device according to the invention. When a device is first installed, the data storage module 26 includes the unique identifier 260 associated with the device but no short term parameters or long term parameters relating to other unique identifiers (301). The device then transmits (302), by means of the transmitter 22 and antenna 21, an inquiry signal. The device then enters a wait state in which the processor 24 switches on the receiver 23 and waits to receive any responses to the transmitted inquiry signal. If no responses are received within a predetermined period (say 30 ms) the device enters a standby mode (304) until it is time to transmit the next inquiry signal (302).

However, if the processor determines (303) that at least one response has been received, the processor 24 then checks (305) whether the unique identifier contained in the received response is already in the short term parameter list. If the received unique identifier is already in the list then the processor ignores the response and considers the next response. If a received unique identifier is found not to be in the short term parameters list already then the processor updates (306) the short term parameters list with the unique identifier contained in the received response. This continues until all responses to the inquiry signal (303) have been processed. The device then enters the standby state (304) until either the next inquiry cycle or until an inquiry from another device is received by the device.

Incorporating a standby period (304) in each device allows for substantially simultaneous transmission from many devices without significant blocking interference.

In an alternative embodiment, the device is arranged to store more than one entry for each unique identifier. For instance, the device may be arranged to store a maximum of three instance of contact for each unique identifier. Thus say a device A is in radio contact with a device B 3 times within one week, the device A stores this information i.e. device A has a record of contact with Device B on say Monday, Tuesday and Thursday. If device A is in radio contact with device B again on the Friday, then some management of the data relating to Device B is needed since only three records may be kept. In a preferred implementation of the invention, the device A is arrange to keep the oldest record (Monday) and the newest record (Friday) and delete one of the other records (Tuesday or Thursday). Thus the records held by Device A about contact with Device B would be {Monday, Thursday, Friday}.

Figure 4:
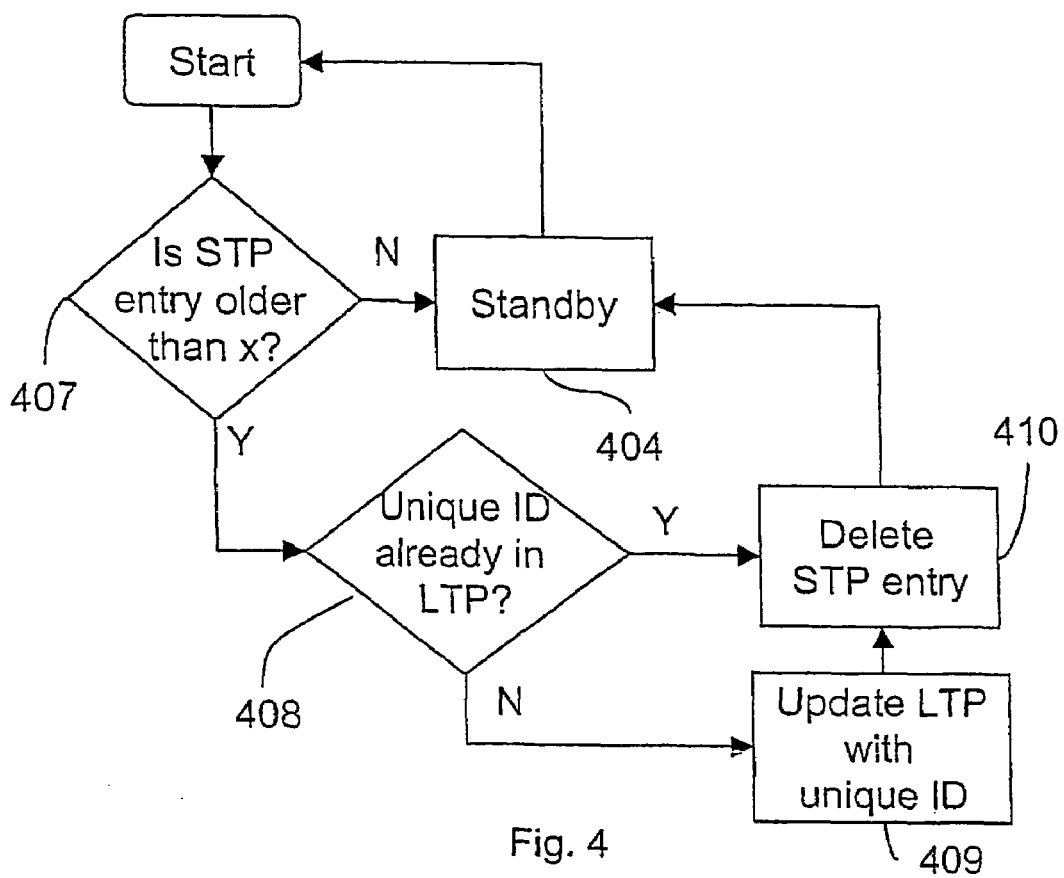
FIG. 4 is a flow diagram illustrating the management of the information stored in a device according to the invention.

Periodically the device moves entries from the short term parameter list 262 to the long term parameter list 264. For instance, the short term parameters list 262 may include all unique identifiers received over a 7 day period. Once a unique identifier has been on the list for a predetermined period (e.g. 7 days), it is then moved to the long term parameters list. This is illustrated in FIG. 4. First the processor checks the age of the entry in the list (407). If the entry has been stored for longer than the predetermined period (7 days in this example), the processor checks (408) whether the unique identifier is already stored in the long term parameters list. If so, the entry is deleted (410) from the short term parameters list and the long term parameters list is not updated. If the unique identifier has not already been stored in the long term parameters list (408), the entry is moved to the long term parameters list 264 (409). Once the management of the short term 262 and long term memory 264 has been carried out, the device enters a standby mode (404) until the next periodic management session.

As stated, preferably all unique identifiers received are added to the short term parameter list 262 and held for a fixed period of say 7 days. After this period, the unique identifier is added to the long term parameter list 264 and deleted from the short term parameter list. Devices that are re-encountered after the 7 day period are re-entered in the short term parameters list.

As an alternative, devices that are re-encountered before the first predetermined period has elapsed have an additional date stamp added to the existing record.

It is the intention that the long term parameters list 264 always maintains a record of all the devices with which the device has made contact. A full history of all devices with which the device has come into radio contact in the lifetime of the device is therefore maintained. The amount of memory used for storing the long term parameters list (in particular) can be reduced by applying a compression algorithm to the long term parameters.

More than one long-term parameter may be defined. For instance, the example described above had a short term parameter list including those contacts made within the previous 7 days and a long term parameter list for those contacts made longer ago than 7 days. In an alternative embodiment of the invention, the device is arranged to store a plurality of long term parameters for each unique identifier and so build up a history of contacts with a particular animal or device. An example is shown in Table 1 in which the "Age of Contact" indicates the difference between the current time and the time contact was made.

TABLE 1

| ID #<br>Age of contact | No of records kept for each contact |
|---|---|
| <7 days | 3 |
| 1 week–1 month | 3 |
| 1 month–3 months | 3 |
| 3 months–6 months | 1 |
| >6 months | 1 |

For instance, as shown in Table 1, a device is arranged to be able to store three entries for contacts with a particular animal encountered within the past week from the current date (short term parameters). Similarly, the device is arranged to be able to store four types of long term parameters: three entries for contact with a particular animal within one week to one month from the current date; three entries for contact with a particular animal within one to three months from the current date; one entry for a contact with a particular animal within three to six months from the current date; and one entry for contact with a particular animal within a period greater than six months. The time stored may be in any convenient format, e.g. seconds, and is set by the clock of the receiving device.

Table 2 shows an example of a list of contacts made by a device C with a device D having a unique identifier #12345678. In this table, the "Time of Contact" is given as the absolute time (in seconds) that the contact was made i.e. the time as stamped by an internal clock of the receiving device. The "Age of Contact" is given as the difference between the current time y and the time of contact c. The ranges correspond roughly to those shown in Table 1.

TABLE 2

| Contact # 12345678<br>Age of contact y-c (seconds) | Time of Contact (seconds) |
|---|---|
| <604800 | 13930490, 13987694, 14219670 |
| 604801–2419200 | 12298976, 12963934, 13821151 |
| 2419201–7257600 | |
| 7257601–14514200 | |
| >14515200 | 19319 | y = 14535200

In this example, the device D was in radio contact with Device C at least 3 times in the past week, at least 3 times in the period 1 week to 4 weeks prior to the current time and at least once in a period greater than 24 weeks (approximately 6 months) prior to the current time.

As discussed above with reference to FIG. 4, the list of contacts is updated on a regular basis i.e. periodically the device moves shorter term parameters to a longer term parameter list as appropriate. Thus entries are moved from one "row" of Table 2 to a lower row as they meet the thresholds associated with the lower row. So if a periodic management of the data took place at y=14824480, then the oldest entry (14219670) in the short term parameter list (indicated by the first row of data) would no longer meet the criterion for that list (y–c<604800) and so the entry would be moved to the next long term parameter list (indicated by the second row of data). If the memory is arranged to store a maximum of three entries in this list, as described earlier, then one of the middle two entries in this row (12963934 or 13821151) is deleted.

This periodic management of the short term and long term parameters in the data storage module 26 therefore results in a summary of the radio contacts made by a first device within given time intervals. The cycle can be triggered by a message from the processor 24 in response to the clock i.e. at pre-determined intervals. Equally the process can be triggered by the amount of memory that is full e.g. if 75% of the capacity of the data storage module 26 is full then the processor may be arranged to enter the process of managing the short term and long term parameters and perhaps to delete all data that is not in either the first short term parameter list or the oldest long term parameter list.

Figure 5:
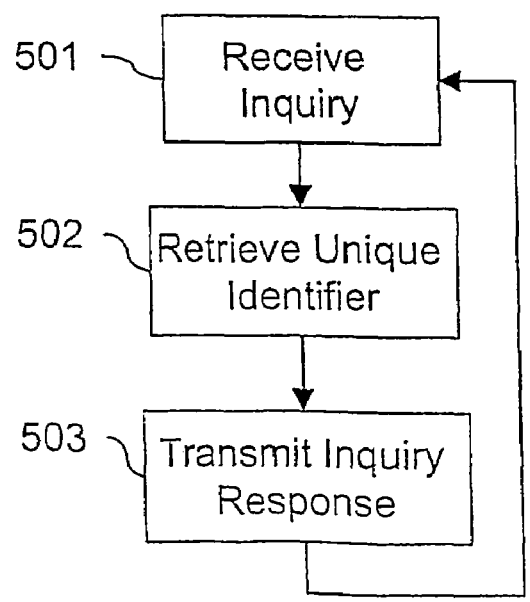
FIG. 5 is a flow diagram illustrating the response cycle of a device according to the invention.

FIG. 5 shows the operation of the device in response to an inquiry signal from another device. When an inquiry signal is received (501), the processor 24 retrieves (502) the unique identifier 260 from the data storage module 26, packs the unique identifier into a suitable message and transmits this (503) in a message by means of the transmitter 22 and antenna 21.

Figure 6:
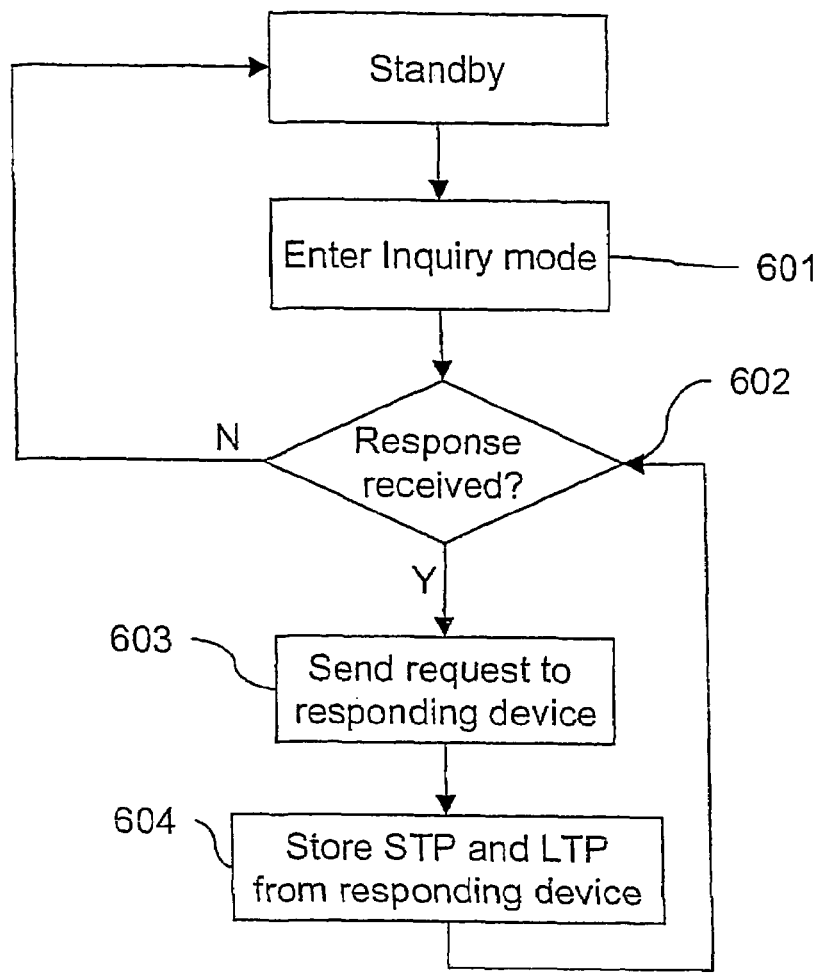
FIG. 6 is a flow diagram illustrating the operation of a reader with a device according to the invention.

FIG. 6 shows a flow diagram of the operation of a reader according to the invention. First the reader enters an inquiry state (601) to establish which devices are within its transmission range. On receipt of a response signal (602) the reader then establishes a connection with the responding device and the reader sends a request (603) to the device identified by the unique identifier to transmit the unique identifiers contained in the short term and long term memory. This information is then stored (604) in the memory of the reader under the unique identifier of the responding device, so forming a local list of contacts for further reference.

The list of contacts may be made available to other interested parties in various ways e.g. broadcast in some way, posted on a website, published by a government agency etc. This would enable the current location of the animals concerned to be identified and hence traced. This tracing can be used to identify all the animals and locations that may be vulnerable to the disease and to identify the source of the disease.

The transmission range of the reader may be variable so that an appropriate level can be selected for the task in hand. For instance, say the reader is a handheld wireless reader for use by a farmer who wants to read the data from a single sheep only. Then a very low transmission range (e.g. 30 cm) would be selected and the reader held within range of the sheep's device. This would avoid receiving the information from another sheep in the vicinity. If a farmer wanted to read all the data from cattle passing through a weighing device, a higher transmission range (e.g. 1 m) would be selected and the reader positioned in a place that would be within 1 m of the weighing device. If a farmer wants to download the data from all livestock in a given field say, then an even higher transmission range (e.g. 15 m) would be selected. In a livestock market an even higher transmission range might be needed if the reader were to gather information from all animals entering the market. The reader does not need to be wireless. It may for instance plug into a device that is situated at a market.

It is envisaged that a device and system according to the invention could also be associated with wireless positioning apparatus such as a Global Positioning System (GPS) device and thus the geographical location of each contact could also be recorded.

The invention will now be described with particular reference to the Bluetooth specification version 1.1 as an exemplary embodiment. According to Bluetooth, each device has a unique identifier defined as a Bluetooth Device Address BD_ADDR which is a 48 bit address made up of a Lower Address Part (LAP) consisting of 24 bits, an Upper Address Part (UAP) consisting of 8 bits and a Non-significant Address Part (NAP) consisting of 16 bits.

According to Bluetooth™ version 1.1, a channel is represented by a pseudo-random hopping sequence that hops between a plurality of frequencies e.g. 23. The channel is divided into time slots of 625 μs each where each slot represents a frequency hop. The nominal hop rate is 1600 hops/second.

Figure 7:
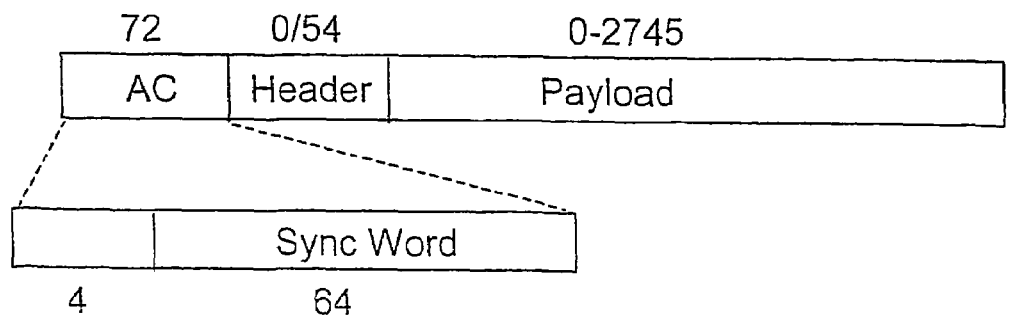
FIG. 7 shows an example inquiry message format to be used by a device according to the invention.

Packets of data may be exchanged in each time slot. Each packet has a format as shown in FIG. 7. The packet includes an access code (AC) of 72 bits. The packet may also include a header of 54 bits and a payload of 0 to 2745 bits. However in the proposed implementation, the messages to be sent and received are similar to the inquiry and inquiry response messages described in the Bluetooth specification and as such do not require a header or a payload. The access code comprises a 4-bit preamble and a 64-bit sync word. The preamble is a fixed binary pattern, dependent on whether the Least Significant Bit (LSB) of the sync word is 0 or 1. The Sync Word is derived from the 24-bit address Lower Address Part (LAP) relevant to the access code type used.

In Bluetooth there are three access code types defined: Channel Access Code (CAC), Device Access Code (DAC) and Inquiry Access Code (IAC). In the latter case there are two sub-types: General Inquiry Access Code (GIAC) and Dedicated Inquiry Access Code (DIAC). Reserved, dedicated LAPs are used to generate the Sync Word for the IAC and may take any address from 0x9E8B00 to 0X9E8B3F Hexadecimal. There is one GIAC and 63 DIACs. The GIAC is defined in Bluetooth as the address 0x9E8B33 in Hexadecimal (10390323 in decimal). The device is also programmed with any DIACs that are appropriate for the device. For instance, a DIAC may be defined for livestock movement and all devices that relate to this area of application would be programmed with this DIAC.

In Bluetooth, devices are dynamically defined as Master or Slave and each device may adopt either role. Each device is programmed with data relating to the timing of when the device is to enter a Master mode and how often and for how long the device is to enter a so-called Inquiry Scan mode. The device is also programmed with the IAC(s) for which the device is to listen.

Figures 8, 9:
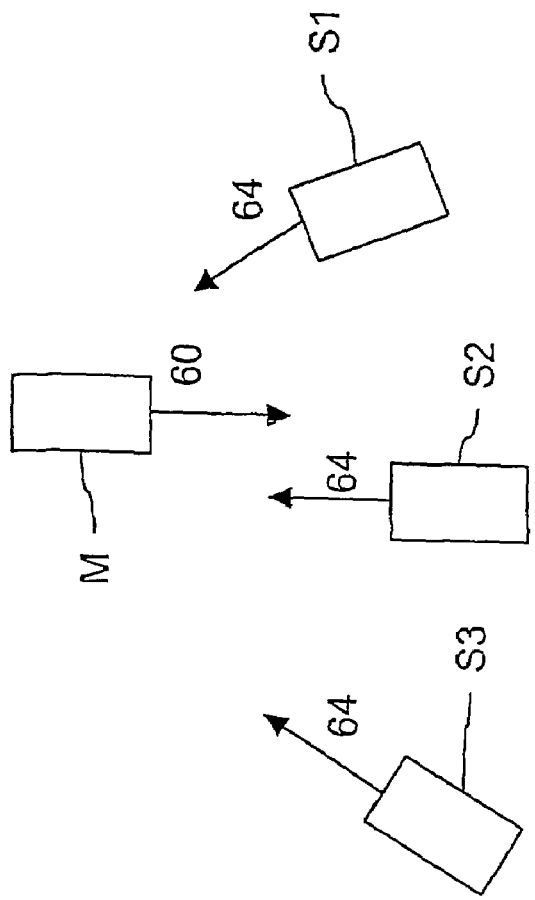
FIG. 8 shows one embodiment of a wireless system using devices according to the invention.
FIG. 9 shows an example inquiry response message format to be used by a device according to the invention.

FIG. 8 shows an example of such a system. In FIG. 8 a first device M is operating as the Master and the other devices S1, S2 and S3 are operating as slaves. When the device M enters an inquiry mode, it transmits an inquiry signal 60 in a form known as an ID packet. This packet consists of the IAC and has a fixed length of 68 bits. In the scenario where all the livestock tracking devices have a DIAC, this DIAC is used to form the ID packet. The ID packet may also include an indication of the Class of Device/Service that should respond to the Inquiry signal. According to the invention, a Class of Device/Service such as "Livestock Management", "Animal Management", "Cow", "Sheep" etc could be defined. The Master continues to transmit this inquiry signal either for a predetermined time (e.g. 10 seconds) or until a maximum number of responses have been received or until at least a pre-determined time has elapsed without receiving any Inquiry response signals. In between each inquiry message, the Master listens for Inquiry Responses.

The slaves S1, S2 and S3 periodically enter an Inquiry Scan mode in which each slave examines any received signals searching for an IAC that matches the IAC(s) programmed into the device. Each device has a defined scan interval that is preferably in the region of 2.5 seconds i.e. in this case, each device is programmed to enter an inquiry scan mode every 2.5 seconds.

When the slave finds a match between the received signal and a programmed IAC, the slave transmits an Inquiry Response signal 64 after a pre-determined time e.g. one slot period (625 μs). The Inquiry Response signal is a Frequency Hopping Synchronisation (FHS) packet including the recipient's BD_ADDR address and may also include other device specific information such as type of device (cow, sheep, pig, market etc.). The general format of signal 64 is as shown in FIG. 7 and the format of the payload is shown in FIG. 9. The payload of the FHS packet includes the LAP, UAP and NAP of the device which together form the unique identifier BD_ADDR for the device. The payload also includes a Class of Device (COD) field.

It would be infeasible for a master to process responses from all slaves if the slaves all responded at the same time to an inquiry signal. Therefore the devices are programmed to generate a random number when a relevant Inquiry message is received and to return to a Standby state for a time indicated by the random number. Owing to the possibly large number of potential slaves in a livestock situation, the random number is likely to have a relatively large range e.g. from 0 to 4095. At the expiration of this time, the slave re-enters the Inquiry Scan mode and listens again for an Inquiry message including an IAC that matches the IAC(s) stored in the device. If one is received, then the slave transmits an Inquiry Response signal as discussed above.

The Access Code for the Inquiry Response is the GIAC (or the DIAC if there is one). The Master listens for this IAC and, if found, then decodes the response message to re-construct the BD_ADDR of the transmitting device. When the Master receives an Inquiry Response, the Master selects the LAP, UAP, and NAP in the received FHS packet and reconstructs the BD_ADDR of the transmitting device from this.

In a further embodiment of the invention, a device may also be arranged to store any unique identifiers that are part of a message having a DIAC as defined for livestock data gathering. Consider the example shown in FIG. 8. When slaves S1, S2 and S3 transmit Inquiry Response signals 64, then any device in the area that is listening for a message including the DIAC for animal data gathering will decode the Inquiry Response messages even if that device did not transmit an Inquiry message. That is to say, S2 will receive the transmissions from S1 and S3, detect that they include the DIAC that it is looking for and store the unique identifiers of the signals in the memory of device S2. S1 and S3 will operate similarly. Thus, as a result of a single Inquiry message from the Master M, all of M, S1, S2 and S3 will include the unique identifiers of the devices within radio contact of each other.

The invention claimed is:

1. An animal data gathering device comprising: a radio transmitter and receiver, a processor for controlling the operation of the device, and memory for storing information including a first unique identifier associated with the device, wherein the processor is arranged to transmit a signal, by means of the radio transmitter, and to receive, by means of the radio receiver, one or more signals, each representing at least one second unique identifier from other devices, wherein the processor is arranged to store in the memory each second unique identifier, wherein the second unique identifier is associated with a predetermined location information of the other devices, and wherein the memory is adapted to record a history of locations of the animal data gathering device by recording a history of a plurality of the second unique identifiers to thereby store a history of locations of an animal having the animal data gathering device, wherein the device is arranged to enable the storing of a received unique identifier only in response to an inquiry signal transmitted by the said device.

2. An animal data gathering device according to claim 1 further arranged to transmit in an inquiry signal data representing the first unique identifier.

3. An animal data gathering device according to claim 1 further including location circuitry for providing information relating to the geographical location of the device.

4. An ear tag including an animal data gathering device according to claim 1.

5. An implant including an animal data gathering device according to claim 1.

6. A bolus including an animal data gathering device according to claim 1.

7. An animal data gathering device comprising: a radio transmitter and receiver, a processor for controlling the operation of the device, and memory for storing information including a first unique identifier associated with the device, wherein the processor is arranged to transmit a signal, by means of the radio transmitter, and to receive, by means of the radio receiver, one or more signals, each representing at least one second unique identifier from other devices, wherein the processor is arranged to store in the memory each second unique identifier, wherein the second unique identifier is associated with a predetermined location information of the other devices, and wherein the memory is adapted to record a history of locations of the animal data gathering device by recording a history of a plurality of the second unique identifiers to thereby store a history of locations of an animal having the animal data gathering device, wherein the device is arranged to store the unique identifiers included in any signals received by the device.

8. An animal data gathering device comprising: a radio transmitter and receiver, a processor for controlling the operation of the device, and memory for storing information including a first unique identifier associated with the device, wherein the processor is arranged to transmit a signal, by means of the radio transmitter, and to receive, by means of the radio receiver, one or more signals, each representing at least one second unique identifier from other devices, wherein the processor is arranged to store in the memory each second unique identifier, wherein the second unique identifier is associated with a predetermined location information of the other devices, and wherein the memory is adapted to record a history of locations of the animal data gathering device by recording a history of a plurality of the second unique identifiers to thereby store a history of locations of an animal having the animal data gathering device, wherein the first unique identifier includes information relating to the type of device.

9. An animal data gathering device comprising: a radio transmitter and receiver, a processor for controlling the operation of the device, and memory for storing information including a first unique identifier associated with the device, wherein the processor is arranged to transmit a signal, by means of the radio transmitter, and to receive, by means of the radio receiver, one or more signals, each representing a second unique identifier from other devices and the processor is arranged to store in the memory each second unique identifier, wherein the processor is arranged to store in the memory short term parameters and long term parameters wherein the short term parameters comprise unique identifiers which have been received within a first predetermined period and the long term parameters comprise unique identifiers which have been received within a second predetermined period, said first predetermined period being shorter than said second predetermined period.

10. An animal data gathering device according to claim 9 wherein, before the processor converts a short term parameter into a long term parameter, the processor is arranged to check whether the unique identifier represented by the short term parameter has already been represented by a long term parameter and, if so, to delete the short term parameter and, if not, to convert the short term parameter into a long term parameter.

11. An animal data gathering device according to claim 9 wherein the processor is programmed with a maximum number of short term parameters and long term parameters for each received unique identifier.

12. An animal data gathering device according to claim 9 wherein the processor is arranged to enable the management of the short term and long term parameters at pre-determined time intervals.

13. An animal data gathering device according to claim 9 wherein the processor is arranged to enable the management of the short term and long term parameters in response to the memory reaching a pre-determined level of capacity.

14. An animal data gathering device comprising: a radio transmitter and receiver, a processor for controlling the operation of the device and memory for storing information including a first unique identifier associated with the device, wherein the processor is arranged to transmit a signal, by means of the radio transmitter, and to receive, by means of the radio receiver, one or more signals, each representing at least one second unique identifier from other devices, wherein the processor is arranged to generate a parameter record by associating a date-time stamp with each second unique identifier received, wherein the date-time stamp records the time and date when the second unique identifier was received, and wherein the processor is arranged to store in the memory the generated parameter , and wherein the memory is adapted to record a history of the generated parameters of the animal data gathering device by recording a history of a plurality of the second unique identifiers to thereby store a history of generated parameters of an animal having the animal data gathering device.

15. An animal data gathering device according to claim 14 further arranged to transmit in an inquiry signal data representing the first unique identifier.

16. An animal data gathering device according to claim 14 wherein the device is arranged to enable the generation and storing of a parameter record from a unique identifier received only in response to an inquiry signal transmitted by the said device and from the date-time stamp generated by the said device and associated with the received unique identifier.

17. An animal data gathering device according to claim 14 wherein the device is arranged to generate parameter records from the unique identifiers included in any signals received by the device and to store the parameter records.

18. An animal data gathering device as in claim 14 wherein the first unique identifier includes information relating to the type of device.

19. An animal data gathering device according to claim 14 further including location circuitry for providing information relating to the geographical location of the device.

20. An animal data gathering device according to claim 14 wherein the date-time stamp records the time and date when the second unique identifier was received and includes geographic location information associated with the received signal.

21. An animal data gathering device comprising: a radio transmitter and receiver, a processor for controlling the operation of the device, and memory for storing information including a first unique identifier associated with the device, wherein the processor is arranged to transmit a signal, by means of the radio transmitter, and to receive, by means of the radio receiver, one or more signals, each representing a second unique identifier from other devices and the processor is arranged to generate a parameter record by associating a date-time stamp with each second unique identifier received, wherein the date-time stamp records the time and date when the second unique identifier was received, and wherein the processor is arranged to store in the memory the generated parameters, and wherein the memory is adapted to record a history of the generated parameters of the animal data gathering device by recording a history of a plurality of the second unique identifiers to thereby store a history of generated parameters of an animal having the animal data gathering device and wherein the processor is arranged to store in the memory short term parameters and long term parameters wherein the short term parameters comprise unique identifiers which have been received within a first predetermined period and the long term parameters comprise unique identifiers which have been received within a second predetermined period, said first predetermined period being shorter than said second predetermined period.

22. An animal data gathering device according to claim 21 wherein, before the processor converts a short term parameter into a long term parameter, the processor is arranged to check whether the unique identifier represented by the short term parameter has already been represented by a long term parameter and, if so, to delete the short term parameter and, if not, to convert the short term parameter into a long term parameter.

23. An animal data gathering device according to claim 21 wherein the processor is programmed with a maximum number of short term parameters and long term parameters for each received unique identifier.

24. An animal data gathering device according to claim 21 wherein the processor is arranged to enable the management of the short term and long term parameters at pre-determined time intervals.

25. An animal data gathering device according to claim 21 wherein the processor is arranged to enable the management of the short term and long term parameters in response to the memory reaching a pre-determined level of capacity.

26. An animal data gathering device according to claim 21 wherein the date-time stamp records the time and date when the second unique identifier was received and includes geographic location information associated with the received signal.

27. A species data gathering device comprising: a radio transmitter and receiver, a processor for controlling the operation of the device, and memory for storing information including a first unique identifier associated with the device, wherein the processor is arranged to transmit a signal, by means of the radio transmitter, and to receive, by means of the radio receiver, one or more signals, each representing a second unique identifier from other devices and the processor is arranged to store in the memory each second unique identifier, wherein the memory is adapted to record a history of locations of the animal data gathering device by recording a plurality of the second unique identifiers over time to thereby permanently store a history of locations of an animal having the animal data gathering device.

* * * * *